Feb. 19, 1952 J. E. COLEMAN 2,585,916
CRYSTAL ANALYSIS APPARATUS
Filed May 18, 1945

INVENTOR.
JOSEPH E. COLEMAN
BY
William D. Hall,
ATTORNEY

// Patented Feb. 19, 1952

2,585,916

UNITED STATES PATENT OFFICE 2,585,916

CRYSTAL ANALYSIS APPARATUS

Joseph E. Coleman, Red Bank, N. J., assignor to the United States of America as represented by the Secretary of War Application May 18, 1945, Serial No. 594,468

7 Claims. (Cl. 250—83.6)

(Granted under the act of March 3, 1883, as amended April 30, 1928; 370 O. G. 757)

The invention described herein may be manufactured and used by or for the Government for governmental purposes, without the payment to me of any royalty thereon.

The invention relates to an apparatus for determining the locations of the axes in crystals and, more particularly, to X-ray crystal analysis apparatus and auxiliary jigs which are used for facilitating proper orientation of unfaced quartz crystals, and subsequent cutting of the oriented crystal.

The manufacture of the piezo-electric vibrator plates used in the radio industry for stabilizing the frequencies of the oscillators and band-pass filters depends upon the state of the quartz crystal, i. e., whether it is a perfect or a partially perfect crystal, whether it has crystal faces or areas on the surfaces that have a well-defined pattern, or whether the crystal pattern has been obliterated because of the external erosive action. The "faced" quartz has crystal faces which at once define the location of certain guiding lines through the crystal, called reference axes for crystal cutting, and it is comparatively simple to determine the positions of these guiding lines in the faced quartz. The bulk of the raw material, however, comes in irregular masses broken out of large mother crystals, with no evidence of any of the crystal faces. This is known as "unfaced" quartz, and in the manufacture of oscillator plates from the unfaced quartz it becomes necessary to locate the reference axes accurately by some other means in order that the final plate will have a definite pre-selected relationship with respect to these reference axes. This is known as orientation of the oscillator plate.

Three methods of procedure are used at the present time. These methods are:

(1) The "direct wafering method" in which wafers are sawed directly from the mother crystal and diced into blanks;

(2) The "Z section—Y bar method" in which sections are cut perpendicular to the Z axis, then sawed into bars, and finally sliced into blanks;

(3) The "X block method" in which blocks are cut perpendicular to the X-axis, are sawed into bars or wafers, and sliced into blanks.

The choice of method depends upon the size of the quartz to be cut, whether it is faced or unfaced, and the available testing equipment.

The "direct wafering method" is usually used with small faced quartz; unfaced quartz can be used if X-ray equipment is available. Wafers are sawed directly from the mother crystal.

The "Z section—Y bar method" is suitable for quartz weighing more than 500 grams. It is believed that if the quartz is electrically twinned, there is less salvage than in the "X block method." It can be used with faced quartz or with unfaced quartz. With faced quartz, the location of the Z axis and one of the X directions is comparatively simple, since the growth lines on the $m$ faces or intersection of a rhombohedral and an $m$ face show these directions, and quartz cuts can be readily made at either end and perpendicular to the X axis to produce an X block.

The steps that are followed in obtaining properly oriented oscillator-plates from an irregular mass of raw unfaced quartz are: the identification of the reference axes or the Z, X and Y axes, the handedness of the quartz, and electrical polarity of the X axis.

The invention discloses improvements in the apparatus for identifying the reference axes of the quartz crystal, when it is in the form of an irregular mass of unfaced quartz. More specifically, the invention relates to an X-ray crystal analysis apparatus and a jig used with the X-ray apparatus and the cutting saw which facilitates the determination of the X-axes and the angle of cut of the unfaced crystal.

The X-ray crystal analysis apparatus is used for locating precisely one of the electrical or X-axes of the Z block. When X-rays fall upon the atomic structure of the crystal at definite angles, secondary X-ray waves are produced around each diffracting center. These centers lie in the planes, and from each plane secondary waves are diffracted which interfere with each other by annulling when they are 180° out of phase, and adding when they are in phase. The waves add and reinforce each other only in certain well-defined directions, giving rise to X-ray beams in those directions. The direction of the incident beam and the diffracted beam have a definite angular relation to the diffracting atomic planes in the crystal. These angles are commonly called the "glancing angles." There are many such planes and they are identified by index numbers which give the positions where the plane intersects the reference axis of the crystal. The X-ray apparatus consists of: a source of X-rays that are restricted to a narrow properly filtered beam, a detecting chamber to measure the diffracted rays, and a means for measuring the amount of rotation of the specimen under examination. Rotation is required to meet fully the angular relations between the incident and diffracted beams for the atomic plane used in the examination. The X-ray detecting chamber is known as the "ionization chamber" since the X-ray will ionize and make certain gases conduct an electrical current. The ionization chamber is connected to a direct current amplifier, and the resultant current is used to actuate a milliammeter, maximum reading of the latter indicating proper orientation of the crystal with respect to the impinging beam of the X-ray radiation. The input and output glancing angles are measured by means of a goniometer which is an arc of a circle that has been divided into degrees with a rotating vernier to read the minutes between the degrees. Suitable types of X-ray crystal analysis apparatus are well known in the art. For example, one such type is manufactured by Philips Metalix Corporation, New York, New York; and is known in trade as "Philips X-Ray Crystal Analysis Apparatus," Type 40000.

The invention resides in the improvements of this apparatus and the provision of a jig which can be used with the X-ray apparatus of the above-mentioned type, and, upon the determination of the X-axis, can be transferred directly to a cutting saw, the X-ray machine, the jig, and the cutting saw all being provided with a reference plane which is used for transferring conveniently the determinations made in the X-ray machine onto the cutting saw turntable. In the prior art the X-ray apparatus determinations were marked on the crystal by means of a straight edge and a pencil, the pencil line marking the position of the atomic planes in the crystal. Such method is inferior to the one outlined in this specification since it introduces two errors, destroying the precision of the X-ray determinations. One error takes place during the actual drawing of the line, and the second during aligning of the drawn line with the blade of the cutting saw. The invention automatically eliminates these errors.

It is, therefore, an object of this invention to provide an X-ray crystal analysis apparatus with the instrumentalities which make it possible to orient the unfaced quartz crystal in the proper manner with respect to the X-ray radiation for determining the X-axes of the crystal, these instrumentalities including a reference plane in the X-ray apparatus which matches the reference plane of the jig, and a corresponding reference plane on the turntable of a cutting saw, whereby the electrical axes determinations obtained in the X-ray apparatus can be conveniently transferred to the saw's turntable without the loss of precision in determining the X-axes which is possible in the X-ray apparatus.

It is an additional object of this invention to provide a jig suitable for orienting the unfaced crystals in the X-ray machine which includes a flat, rectangular plane provided with a circular well, a disk mounted in the well, instrumentalities for turning this disk, and for locking it in the well upon the determination of the X-axis of the crystal.

These and other features of the invention will be more clearly understood from the following detailed description and the accompanying drawings, in which.

Figure 1:
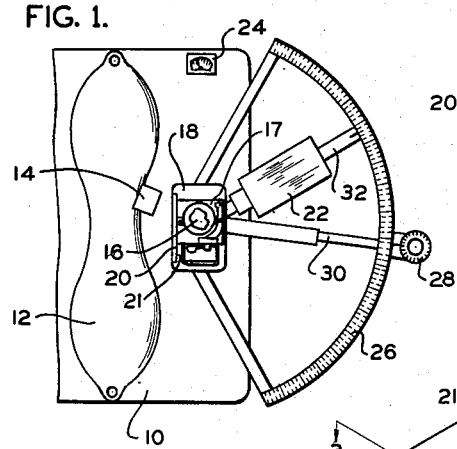
Figure 1 illustrates a plan view of the X-ray apparatus and the jig.

Referring to Fig. 1, the X-ray apparatus is mounted on a table, top 10 of which is illustrated in the figure. The source of X-rays is mounted under the protective hood 12 which protects the operators from the scattered X-ray radiation. Only that side of the X-ray equipment which is used for determining the X-axis is illustrated in the drawing. The protective hood 12 is provided with an X-ray window and filter 14, so that the X-rays of only one wave length emerge from the window. The X-ray beam impinges upon the unfaced crystal 16, mounted on a jig 17. The jig, itself, is mounted on a turntable 18 provided with a reference edge 20 which matches one of the reference edges 21 of the jig. The X-rays, after impinging upon the lattice structure of the crystal, are reradiated and, if the setting of the goniometer is correct, the reradiated beam will be intercepted by an ionization chamber 22. The ionization chamber is connected to a direct current amplifier which is mounted below top 10 of the table, and its output is connected to a meter 24 which indicates the degree of ionization produced in the ionization chamber. When this is maximum, the crystal 16 is properly oriented with respect to the X-ray beam and the reference edges 20 and 21. It now only remains to remove jig 17 from the turntable of the X-ray machine and mount it on a turntable 500 of the cutting machine, reference edge 21 matching reference edge 502 provided on the turntable of the cutting machine. The crystal, upon its mounting on the turntable of the cutting machine, is ready for its cutting by means of a diamond saw 506.

The goniometer of the X-ray machine consists of a graduated arc 26, and with the gear teeth disposed along its outer periphery; a vernier gear 28 engaging the gear teeth of arc 26 and mounted on a vertical axis at the outer end of a vernier arm 30. Arm 30 is mounted on a vertical axis positioned at the center of arc 26. Turntable 18 is fixedly connected to the inner end of arm 30, so that turntable 18, together with its reference edge 20 and jig 17, is rotated when gear 28 is turned. Ionization chamber 22 is rotatively mounted on an arm 32, the vertical axis of which is the same vertical axis used for supporting turntable 18 and arm 30. Angular positioning of the ionization chamber 22 does not disturb the position of turntable 18 or arm 30, since it is rotatively mounted on the vertical axis of the goniometer.

Figure 3:
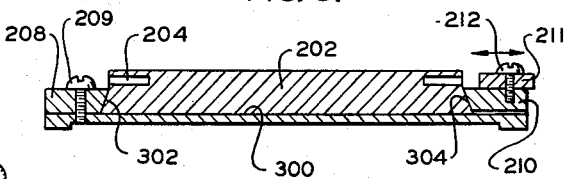
Figure 3 is a cross-sectional view of the jig taken along line 3—3 illustrated in Fig. 2.
Figure 2:
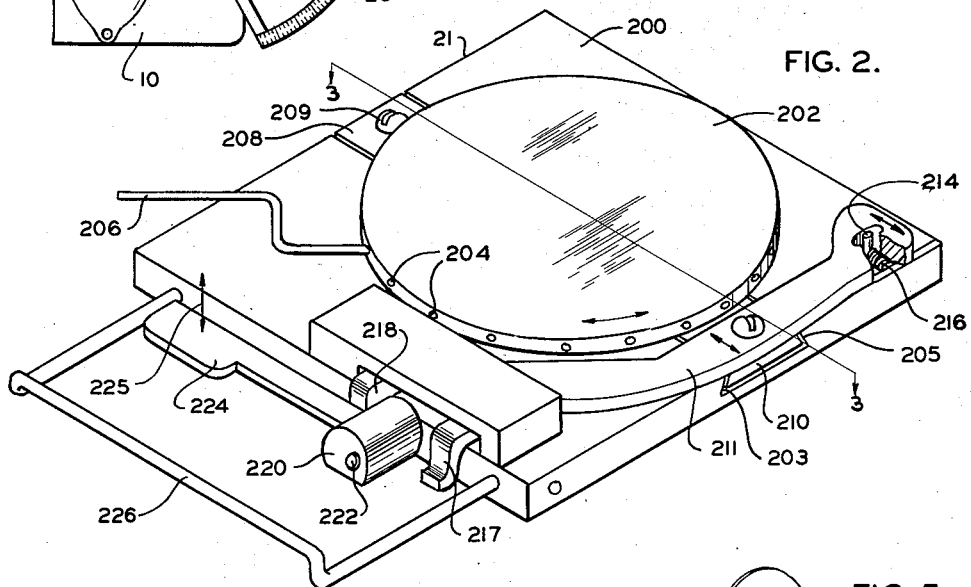
Figure 2 is a perspective view of the jig.
Figure 4:
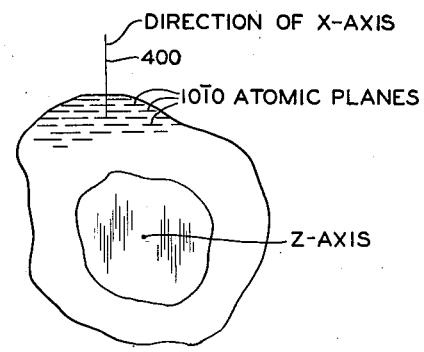
Figure 4 illustrates a piece of unfaced quartz.
Figure 5:
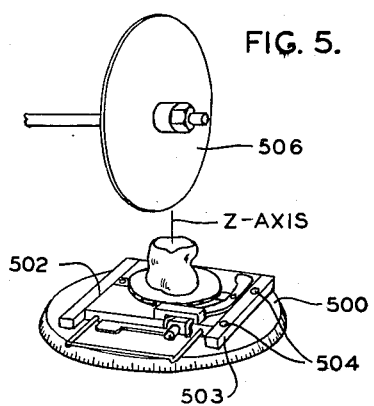
Figure 5 is a perspective view of the cutting saw, its turntable, and the jig mounted on the turntable of the saw.

The X-ray jig is illustrated more fully in Figs. 2 and 3. The jig consists of a rectangular, flat plate 200 provided with the previously mentioned reference edge 21 which, with the crystal properly oriented, is exactly parallel to a line 400 illustrated in Fig. 4, this line being perpendicular to the 1010 atomic planes of the crystal (at right angles to the paper) which are parallel to the X directions of the crystal; these planes are illustrated in Fig. 4 as a series of dotted lines 1010. A shallow counter bore, forming a circular well 300, Fig. 3, is provided in the plate of the jig and a glass-topped, steel, circular disk 202 is fitted into the well, the disk, when unlocked, freely rotating in the well. The glass top is used for mounting the crystal.

The lower portion of disk 202 is beveled, with the result that the side surfaces 302, 304 of the disk are slanting, as illustrated more clearly in Fig. 3. The disk is provided with two beveled shoes 208 and 210, shoe 208 being in fixed position with respect to plate 200 by a set screw 209, while shoe 210 is movable. The two sides of the slots made in plate 200 for holding shoes 208 and 210 are also beveled, as illustrated at 203 and 205, so that the shoes are held down to the mounting plate. Thus the disk is held in fixed relationship with respect to the bottom portion 300 of the well and against rotation by means of fixed shoe 208 and movable shoe 210, mounted on the diametrically opposite side of well 300 when shoe 210 is moved into its locked position. The locking shoe 210 is attached to a locking arm 211 by a set screw 212. The locking arm is pivoted at one end by means of a pivot pin 214 which is slidingly mounted in plate 200, the sliding movement of the pin being resisted by a spring 216 inserted in the well provided for this purpose in plate 200. The reason for making pin 214 slightly movable will be apparent from the description that is to follow. The opposite end of the locking arm 211 terminates in a bifurcated portion provided with the extensions 217 and 218 which engage a cam 220 during the unlocked and locked positions of the cam, respectively. Cam 220 is rotatively mounted on a pin 222, and is provided with a handle 224 which makes it possible to rotate cam 220 around pin 222. The possible movement of arm 224 is illustrated in the drawing by an arrow 225. The arm is in locked position in Fig. 2, with the result that cam 220 engages arm 218, thus shifting the entire locking arm 211 to its extreme left position as seen in Fig. 2. Since locking shoe 210 is attached to the locking arm by set screw 212, the locking shoe will move with the arm, and thus engage the beveled surface of the disk, as illustrated in Fig. 3. Since pin 214 represents a spring control fulcrum, the pressure exerted on the beveled edge 304 of the disk is controlled by spring 216; it is more convenient when pin 214 has a slidable type of mounting, than a fixed mounting, since the outside diameters of the disks vary due to the manufacturing tolerances, and by making the pin spring controlled it is possible to move arm 224 into its extreme locked position with the disks of slightly different diameter, without shearing off the pin when the disk is of large diameter, or leaving it unlocked when it is of slightly smaller diameter. The locking device is also self-compensatory for the wear of the disks and of the locking device. In order to protect the operator from injury by the X-rays, the crystal which is mounted on disk 202 is partly covered by a lead shield which makes it necessary to rotate the disk and lock it from outside the shield. Therefore, the disk should be higher than the depth of the counter bore, as illustrated in the figures. The projecting portion of the disk is provided with holes 204 equally spaced around the periphery of the part of the disk projecting above the base plate. Wrench 206, consisting of a bent rod, is placed into one of these holes and provides a convenient means for rotating the disk during the orienting process of the crystal. The rod wrench is of sufficient length to turn the disk with the operator remaining outside the region of the scattered X-rays. The jig is also provided with a handle 226 permanently attached to plate 200, this handle being used for handling the jig without exposing the operator to the X-rays.

In order to determine the position of the X-axis of crystal 16, it is first oriented in the polariscope and conoscope for determining its optical axis which coincides with the Z-axis. Upon the determination of the Z-axis, the crystal is cut on two sides, thus providing two planes perpendicular to the Z-axis. The crystal is then mounted on jig 17, with the Z-axis perpendicular to the surface of the jig. For a more detailed description of the procedure and jigs used in determining the Z-axis of the unfaced crystal, reference is made to my co-pending application for patent titled "Crystal Analysis Apparatus," Serial Number 594,467; filed May 18, 1945, now Patent No. 2,497,070.

The 1010 atomic planes which are parallel to the X-axis are used for determining the position of the X-axis in the X-ray equipment. The input glancing angle is 10° 38' and, therefore, the goniometer arm 30 is set to that angle. The ionization chamber 22 and its arm 32 are set to 21° 16' on the goniometer scale. The quartz is then moved toward the angular X-ray beam and rotated in the circular well of the jig by means of wrench 206. Moving the quartz to and from the incoming beam and rotating it slowly a position can usually be found at which a maximum current indication is obtained. When this is the case, the X-axis direction is perpendicular to the reference edge 21 of the jig or 20 of the X-ray machine. A maximum reading will appear when the diffracting atoms 400 in Fig. 4 are closest to the surface of the specimen.

When a maximum reading is obtained, disk 202 is locked in the well by means of the lock-shoe 210 and lever arm 224 and the jig is transferred to the sawing table 500 with the reference edges 21 of the jig and 502 of the sawing table matching each other. This is accomplished by aligning the two surfaces 21, 502 against each other and locking plate 200 in this position by means of a locking bar 503, which is provided with locking nuts 504. The saw-blade 506 will then cut the quartz perpendicular to the X-axis, since the plane of the saw is parallel to the plane of the reference edges 21 and 502.

From the given description, it is apparent that the directions of the X-axis obtained in the X-ray equipment are automatically transferred to the turntable of the cutting saw and, since this is accomplished by means of reference edge 21 of the jig, it is obvious that the precision with which the X-axis has been determined in the X-ray equipment will not be lost during the transfer of the jig from one machine to the other, so long as the plane of the cutting saw is parallel to the plane of the reference edge 502. This method of transferring the determinations obtained in the X-ray machine to the cutting saw is obviously superior to the prior methods which resorted to the use of pencil lines drawn on the window of the quartz block, since drawing of the line and its subsequent alignment on the turn-table of the cutting saw introduces a compound error which nullifies to a large extent the precision inherently available with the X-ray radiation method of determining the X-axis.

It is believed that the construction and operation of the disclosed apparatus, as well as the main advantages thereof, will be apparent from the given description. It should be understood that while I have shown and described my invention in preferred form, reasonable changes and modifications may be made without departing from the spirit of the invention as sought to be defined in the following claims.

I claim:

1. In an X-ray crystal analysis apparatus for determining the electrical axis of an unfaced crystal including a source of X-ray radiation; a goniometer having its vertical axis positioned at the center of the arc formed by the angular scale of said goniometer, first and second independently rotating radial arms mounted on said vertical axis, an ionization chamber mounted on said first arm, a turn-table fixedly mounted on said second arm at the axis' end of said second arm whereby said turn-table rotates around said vertical axis with said second arm, a reference surface on said turn-table, and a jig removably mounted on said turn-table, said jig having a reference surface matching the reference surface of said turn-table, and also having a rotatable crystal support mounted thereupon, whereby, upon the removal of said jig from said turn-table, the reference surface on said jig acts as a means for indicating the direction of the electrical axis determined with said X-ray apparatus.

2. X-ray crystal analysis apparatus as defined in claim 1 in which said reference surface on said turn-table comprises a plane surface parallel to the plane defined by the determined electrical axis and the optical axis of said crystal.

3. X-ray crystal analysis apparatus as defined in claim 1 in which the plane of said turn-table is perpendicular to said vertical axis and to the optical axis of said crystal, and in which said reference surface on said turn-table comprises a plane surface parallel to the plane defined by the determined electrical axis and the optical axis of said crystal.

4. X-ray crystal analysis apparatus as defined in claim 1 in which said support comprises a disk rotatable around a vertical axis and having its upper surface in a horizontal plane, said crystal being mounted on said upper surface whereby the angle of incidence of the X-rays upon the atomic planes of said crystal may be varied by varying the angular position of said disk.

5. X-ray crystal analysis apparatus for determining the electrical axis of an unfaced quartz crystal comprising a source of X-ray radiation, a goniometer having its vertical axis positioned at the center of the horizontal arc formed by the angular scale of said goniometer, first and second independently rotating radial arms mounted on said vertical axis so as to rotate in a horizontal plane around said axis, an ionization chamber mounted on said first arm whereby the angular position of said first arm indicates the angular position of the optical axis of said ionization chamber, a turn-table fixedly mounted on said second arm at the axis' end of said second arm whereby said turn-table rotates around said vertical axis with said second arm, the upper surface of said turn-table being perpendicular to said vertical axis, a reference bar mounted on the surface and along one edge of said turn-table, the inner-side reference surface of said bar comprising a plane parallel to the plane defined by the electrical and optical axes of said crystal, a crystal-holding jig having a rotatable crystal support mounted thereon and including a flat plate slidingly mounted on the surface of said turn-table, one side of said plate matching said reference surface of said bar, and instrumentalities for sliding said jig plate along said reference surface of said bar for adjusting the point of incidence of said X-ray upon the atomic planes of said crystal.

6. X-ray crystal analysis apparatus as defined in claim 5 in which said crystal-holding jig further includes instrumentalities for rotating around a vertical axis the crystal fixedly mounted on top of said jig.

7. X-ray crystal analysis apparatus as defined in claim 5 in which said support comprises a disk having its upper surface in a horizontal plane and rotating around a vertical axis, said crystal being fixedly mounted on said upper surface, and further including means for locking and unlocking said disk.

JOSEPH E. COLEMAN.

REFERENCES CITED

The following references are of record in the file of this patent:

UNITED STATES PATENTS

| Number | Name | Date |
|---|---|---|
| 1,589,833 | Behnken et al. | June 22, 1926 |
| 2,141,751 | Hertlein | Dec. 27, 1938 |
| 2,151,736 | Broughton | Mar. 28, 1939 |
| 2,357,307 | Bond | Sept. 5, 1944 |
| 2,377,862 | Bond | June 12, 1945 |
| 2,380,235 | Harker | July 10, 1945 |
| 2,381,993 | Baker | Aug. 14, 1945 |
| 2,383,764 | Bond | Aug. 28, 1945 |
| 2,392,528 | Fankuchen | Jan. 8, 1946 |
| 2,394,622 | Luley | Feb. 12, 1946 |
| 2,430,969 | Young | Nov. 18, 1947 |